(12) United States Patent
Dutta et al.

(10) Patent No.: US 7,124,096 B2
(45) Date of Patent: Oct. 17, 2006

(54) QUERY SYSTEM FOR SERVICE AVAILABILITY ACCORDING TO CUSTOMIZED CRITERIA

(75) Inventors: Rabindranath Dutta, Austin, TX (US); Kumar Ravi, Cedar Park, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 09/952,006

(22) Filed: Sep. 13, 2001

(65) Prior Publication Data

US 2003/0050865 A1    Mar. 13, 2003

(51) Int. Cl.
*G06Q 30/00* (2006.01)

(52) U.S. Cl. .......................................... 705/26; 705/37
(58) Field of Classification Search ................. 705/14, 705/27, 28, 26, 37
See application file for complete search history.

(56) References Cited

U.S. PATENT DOCUMENTS

| | | | | |
|---|---|---|---|---|
| 4,887,208 | A | 12/1989 | Schneider et al. | 364/403 |
| 5,878,401 | A | 3/1999 | Joseph | 705/22 |
| 6,035,288 | A | 3/2000 | Solomon | 705/37 |
| 6,101,484 | A | 8/2000 | Halbert et al. | 705/26 |
| 6,119,094 | A | 9/2000 | Lynch et al. | 705/5 |
| 6,119,101 | A * | 9/2000 | Peckover | 705/26 |
| 6,125,391 | A | 9/2000 | Meltzer et al. | 709/223 |
| 6,134,534 | A | 10/2000 | Walker et al. | 705/26 |
| 6,167,383 | A * | 12/2000 | Henson | 705/26 |
| 2001/0014868 | A1* | 8/2001 | Herz et al. | 705/14 |
| 2001/0044743 | A1* | 11/2001 | McKinley et al. | 705/14 |
| 2003/0055772 | A1* | 3/2003 | Goldstein | 705/37 |

FOREIGN PATENT DOCUMENTS

WO    W/O 99/39281    *    5/1999

OTHER PUBLICATIONS

"Mobil commerce agents in WAP-based services"; Mihhail Matskin; Journal of Database Management; Jul.-Sep. 2001.*

* cited by examiner

*Primary Examiner*—Wynn W. Coggins
*Assistant Examiner*—R. E. Rhode, Jr.
(74) *Attorney, Agent, or Firm*—Duke W. Yee; Marilyn Smith Dawkins; Gerald H. Glanzman (57) ABSTRACT

A method, program, and system for checking the availability of goods and services by means of the Internet are provided. The invention comprises compiling a customer profile, which may include information related to business affiliation as well as personal preferences. The customer uses a general search engine to submit a query regarding a desired good or service, and the search engine returns a list of suppliers that satisfy the search generic criteria. Special software on the client machine then sends more detailed queries, along with the customer profile, directly to certain suppliers selected from the list. These suppliers then return information, which corresponds to the customer profile. This information may include availability of specific accommodations, special discounts, as well as exclusive goods or services not offered to the general public.

15 Claims, 4 Drawing Sheets

| Preferred Hotel | Preferred Customer # | Priority |
|---|---|---|
| Holiday Inn | 548729 | 3 |
| Days Inn | 612570 | |
| | | |

Employer: IBM

Employee Number: PR4307

| Club Membership | Priority | Airline | FF# | Priority |
|---|---|---|---|---|
| AAA | 2 | Delta | | 2 |
| AARP | | United | | |

| Smallest Room | Largest Room | Priority |
|---|---|---|
| 2 Bed twin | Suite | 3 |

| Special Accomodations | Priority | Price Range | | Priority |
|---|---|---|---|---|
| Handicap Access | 1 | $55.00 | $115.00 | 1 |

| Recreation | Priority | Other Information | Priority |
|---|---|---|---|
| Health Club | 3 | Public transport access | 2 |
| Pool | 3 | | |
| Night clubs | 4 | | |

FIG. 8

```
Hotel Name: Holiday Inn

Location:   City          State    Country
            Falls Church  VA       USA Hotel Address: 2345 Leesburg Pike Rooms:           Offered Rate:     Applied Discount:
  2 bed twin     $65.00/day        IBM
  2 bed queen    $80.00/day        IBM
  Suite          $110.00/day       IBM Special Accommodations: Handicap accessible Recreation: Health club, Pool Other Requested Information:  Public Transportation:
                              Metro Station 2 miles from hotel.
                              Complementary shuttle service
                              to station.
```

QUERY SYSTEM FOR SERVICE AVAILABILITY ACCORDING TO CUSTOMIZED CRITERIA

BACKGROUND OF THE INVENTION

1. Technical Field

The present invention relates generally to computer network environments, and more specifically to online searches for goods and services.

2. Description of Related Art

Current search mechanisms may provide customers with a list of links to stores and service providers in a specified geographic area. However, there is no mechanism to short list search results and display them per specific criteria for the customer.

If a customer wishes to find a service in a specified area, current search services will provide the customer with a list of all the registered service providers in the area, and perhaps the price range and service provided. However, it is up to the customer to keep calling the various providers in order to determine if a specific good/service is available in the customer's preferred price range on specific date, according to specific customer criteria. Examples include hotel rooms and plane tickets. In addition to these limitations, what search services do exist may rely on an aggregated server which compiles search patterns and may allow third parties to misuse customer information.

Currently, customers may not be aware of possible employer or other discounts for a given service (e.g., AAA discounts, AARP discounts), and not even think to inquire as to whether such discounts are available.

Therefore, it would be desirable to have a method for querying goods and service providers and receiving an automatic response, which addresses specific customer criteria and helps with short listing and displaying of search results in order of priority.

SUMMARY OF THE INVENTION

The present invention provides a method, program, and system for checking the availability of goods and services by means of the Internet. The invention comprises compiling a customer profile, which may include information related to business affiliation as well as personal preferences. The customer uses a general search engine to submit a query regarding a desired good or service, and the search engine returns a list of suppliers that satisfy the search generic criteria. Special software on the client machine then sends more detailed queries, along with the customer profile, directly to certain suppliers selected from the list. These suppliers then return information, which corresponds to the customer profile. This information may include availability of specific accommodations, special discounts, as well as exclusive goods or services not offered to the general public.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
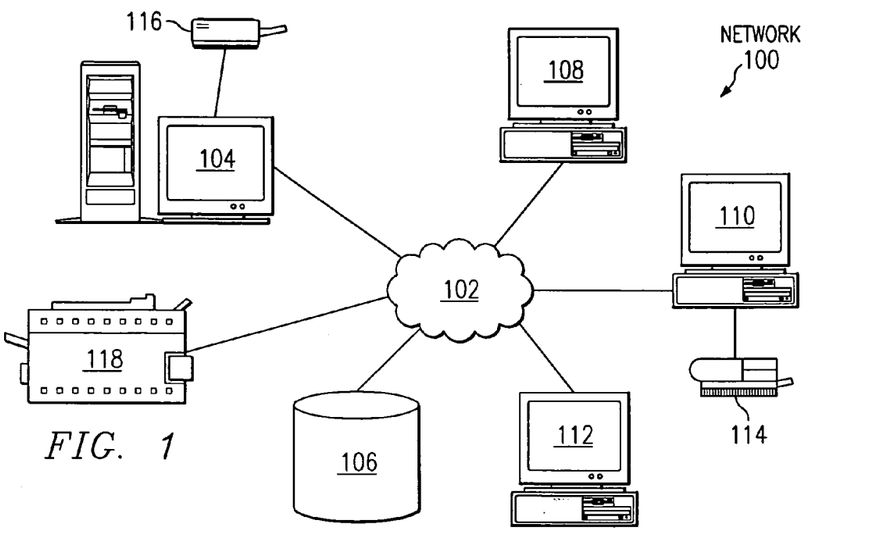
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 also includes printers 114, 116, and 118, and may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
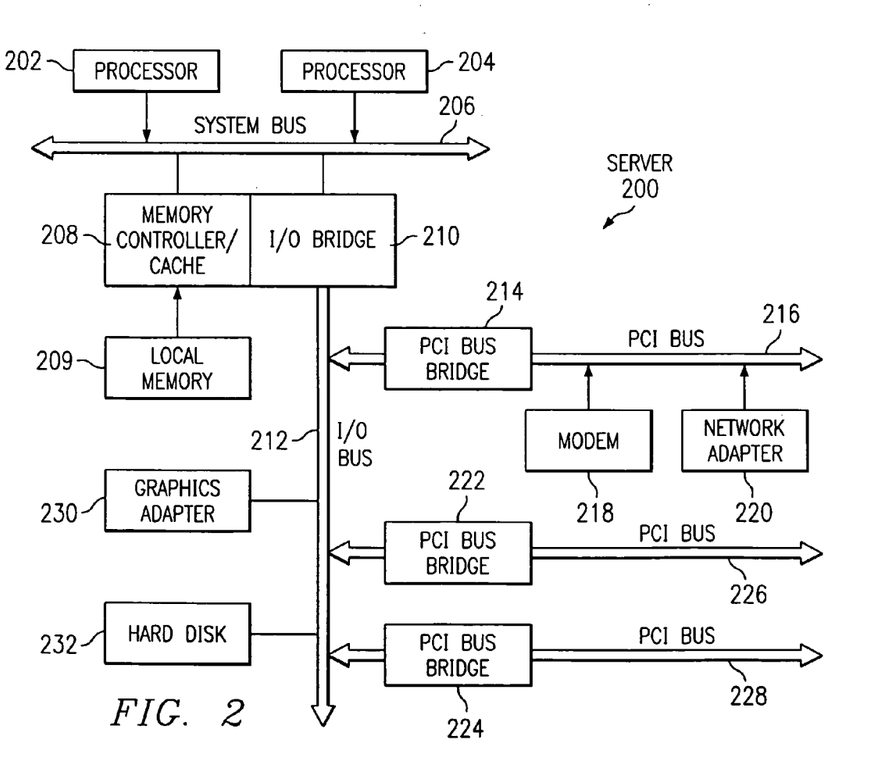
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
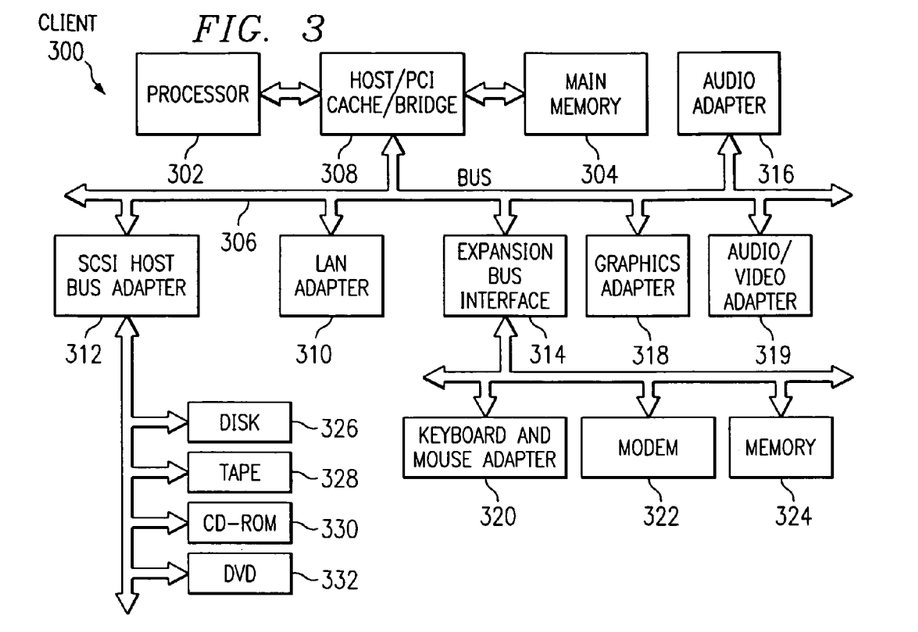
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a goods/services search mechanism that is guided by predefined customer preferences, allowing the customer to determine the availability of goods and services within a specified geographic area, at preferred prices and on preferred dates (or within a specified time interval).

Figure 4:
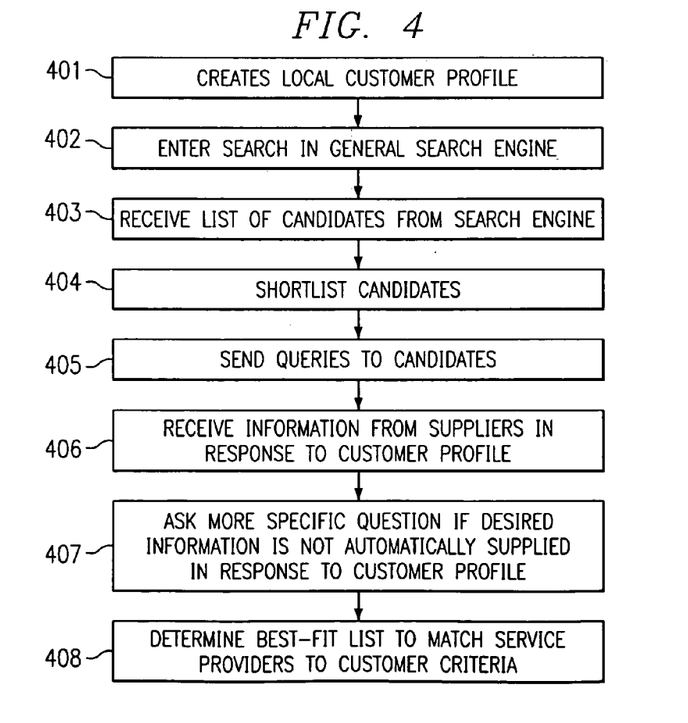
FIG. 4 depicts a flowchart illustrating a general overview of the dynamic query system in accordance with the present invention.
Figure 5:
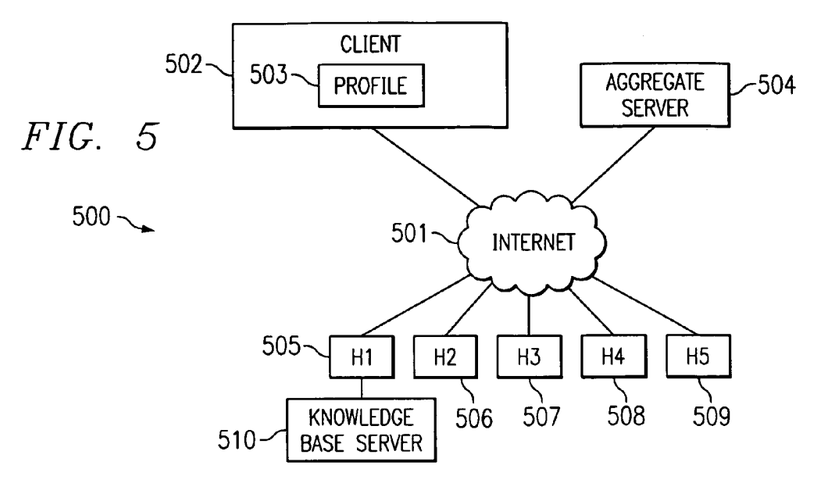
FIG. 5 depicts a schematic diagram illustrating the architecture of the dynamic query system in accordance with the present invention.

Referring to FIG. 4, a flowchart illustrating a general overview of the dynamic query system is depicted in accordance with the present invention. FIG. 5 depicts a schematic diagram illustrating the architecture of the dynamic query system in accordance with the present invention. For simplicity, the following example will focus on searching for hotel accommodations. However, it should be pointed out that the present invention can be applied to any product, which includes both goods and services.

The customer begins by creating a customer profile (step 401). This profile 503 is maintained on the local client 502 (e.g., PC, PDA) that the customer is using to access the search service and is not shared with the aggregate server 504. The profile 503 might contain standard identification information such as name and address. The profile 503 may also contain information that is more directly related to purchasing goods and services. Examples of items in the profile include: coupons, corporate name, airline frequent flier number, personal hobbies, hotel amenities preferences (e.g., health club, restaurant, room size, smoking preference), or other items that may entitle the customer to price discounts or special services not offered to the general public.

Figure 6:
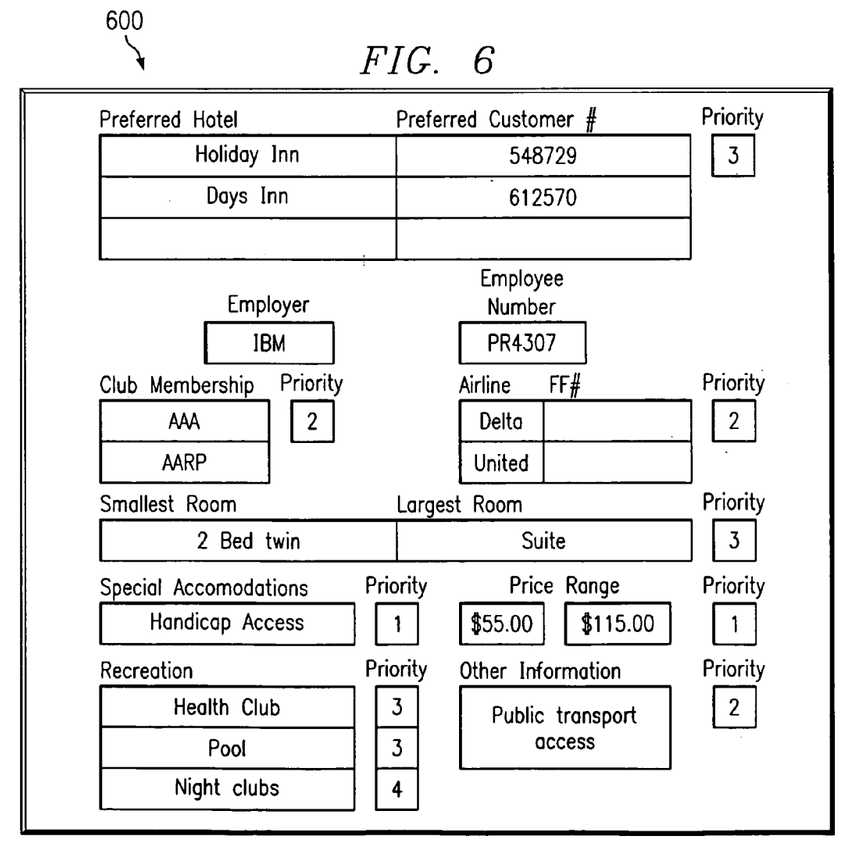
FIG. 6 depicts a pictorial diagram illustrating a customer profile display in accordance with the present invention.

Referring to FIG. 6, a pictorial diagram illustrating a customer profile display is depicted in accordance with the present invention. The example illustrated in FIG. 6 is based on the example customer profile described below. Display 600 contains entry fields for the various categories within the customer profile, as well as the priority assigned to each of these criteria. These categories relate not only to customer service preferences (e.g., room size), but also to other parameters which may entitle the customer to special discounts (e.g., employer, airline), as explained above. FIG. 6 is merely an example. Other categories may be contained in the customer profile. The following is an example of a XML of the customer profile displayed in FIG. 6:

```
<Hotels>
   <Preferred Hotels>
      priority=3
      <Hotel 1>
         Name=Holiday Inn
         Choice=1
         Pref.Cust.#=548729
      </Hotel 1>
      <Hotel 2>
         Name=Days Inn
         Choice=2
         Pref. Cust.#=612570
      </Hotel 2>
   </Preferred Hotels>
   <Employer>
      Name=IBM
      Employee#=PR4307
   </Employeer>
   <Clubs>
      priority=2
      <Club1>
         Name=AAA
         Member #=
      </Club 1>
      <Club 2>
         Name=AARP
         Member#=
      </Club 2>
   </Clubs>
   <Airlines>
      priority<2
      <Airline 1>
         Name=Delta
         FF#=
      </Airline 1>
      <Airline 2>
         Name=United
         FF#=
      </Airline 2>
   </Airlines>
   <Room type>
      priority=3
      Smallest=2 bed twin
      Largest=Suite
   </Room type>
   <Special Accommodations>
      priority=1
      Description=Handicap access
   </Special Accommodations>
   <Price Range>
      priority=1
      Lowest price=$55.00
      Highest price=$115.00
   </Price Range>
   <Recreation>
      <Recreation 1>
         priority=3
         Description=Health club
      </Recreation 1>
      <Recreation 2>
         priority=3
         Description=Pool
      </Recreation 2>
      <Recreation 3>
         priority=4
         Description=Night club
      </Recreation3>
   <Other information>
      priority=2
      Description=Public transport access
   </Other information>
</Hotels>
```

Of course, the customer profile depicted above may also be stored in languages and formats other than XML.

Referring back to FIG. 4, the customer begins the search process by entering the search criteria into a general search engine, which is located on aggregate server 504 (step 402). For the hotel example, the search criteria might include hotel location (city), dates of visit, and price range. For customers requiring more immediate hotel reservations, the customer may also supply the aggregate server 504 with his or her current GPS location and distance he or she is willing to continue traveling before stopping at the hotel. The search engine on aggregate server 504 will then return a list of candidates, including their URLs, based on the initial search criteria (step 403). The aggregate server 504 may provide the special software (agent) for client 502 to help automate the search process.

The client agent automatically short lists the search results by choosing candidates (e.g., hotels) from the initial list, according to criteria contained in the customer profile 503 (step 404). The agent then sends queries, containing selective questions based upon profile 503, directly to the servers 505–509 of the chosen hotels (step 405). Both steps 404 and 405 may be performed automatically by the agent software, without user intervention. The queries can take many forms, including, but not limited to, HTML/XML queries, email, and instant messaging. The following is an example of a XML request for information for a given hotel server:

```
<Request for quote>
   City=Falls Church
   State=VA
   Country=USA
   <Date>
      Arrive=Jun. 2, 2001
      Depart=Jun. 4, 2001
   </Date>
   Pref. Cust.#=548729
   <Employer>
      Name=IBM
      Employee#=PR4307
   </Employer>
   <Airlines traveled>
      priority=2
      Delta
      United
   </Airlines traveled>
```

```
<Room type>
    priority=3
    Smallest=2 bed twin
    Largest=Suite
</Room type>
<Special Accommodations>
    priority=1
    Description=Handicap access
</Special Accommodations>
<Price Range>
    priority=1
    Lowest price=$55.00
    Highest price=$115.00
</Price Range>
<Other information>
    priority=2
    Description=Public transport access
</Other information>
</Request for quote>
```

It should be pointed out that not all of the criteria in the customer profile need be sent in the query.

The hotel servers 505–509 then respond to the query based on the information contained in the customer profile 503 (step 406).

Figure 7:
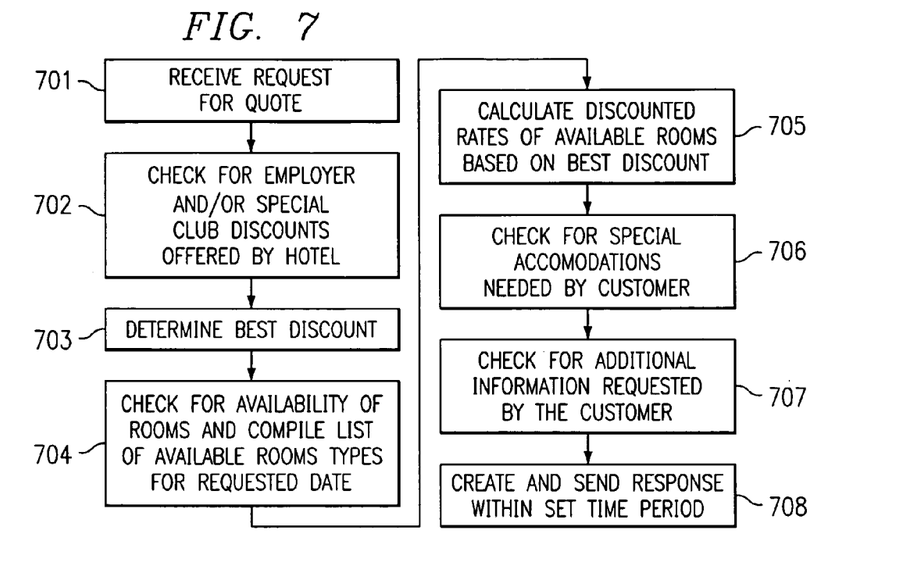
FIG. 7 depicts a flowchart illustrating the process by which service provider servers respond to queries in accordance with the present invention.

Referring to FIG. 7, a flowchart illustrating the process by which service provider servers respond to queries is depicted in accordance with the present invention. The process flow depicted in FIG. 7 is a detailed account of step 406 in FIG. 4. The server receives the request for quote from the customer agent (step 701). The server checks for special discounts offered by the hotel that may be applicable to the customer (step 702). Examples of such discounts include employer, airline, AAA, AARP, and hotel preferred customer discounts. The hotels may also offer special accommodations or services that are only available to certain corporate clients. The server determines the best discount for which the customer is eligible (step 703). Optionally, the server may also verify the information supplied by the customer to make sure that the customer is indeed entitled to the discounts. For example, the server may verify that the customer is in fact an IBM employee by checking the employee number supplied in the query or by use of digital signature. This may also be done for frequent flier, AAA, AARP, and similar identification numbers.

The hotel server determines the availability of rooms based on the criteria in the customer criteria and compiles a list of room types available for the requested dates (step 704). The server then calculates the discounted rates for the available rooms using the best discount determined in step 703 (step 705).

The server checks for special accommodations (e.g., handicap access) needed by the customer and determines if the hotel in question can provide these accommodations (step 706). The server also checks other information requested by the customer (e.g., public transport access) (step 707). In performing steps 706 and 707, the hotel server might rely on a knowledge base server, such as server 510 depicted in FIG. 5, or a message may be sent to a human operator.

Once the hotel server has made the above determinations and calculations, it creates and sends a response verifying the availability of the requested service(s) to the customer agent within a specified time period (step 708).

Figure 8:
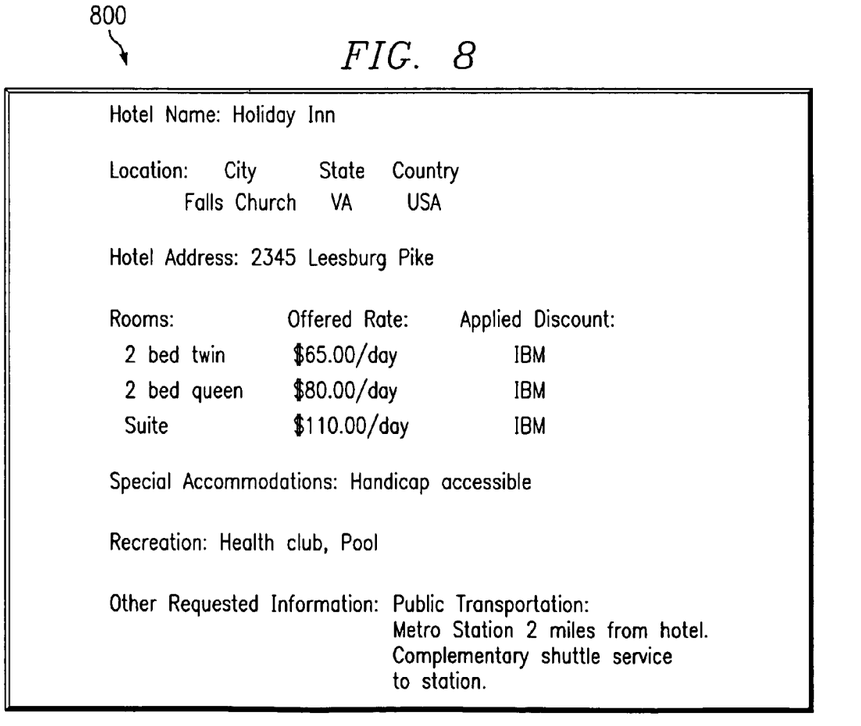
FIG. 8 depicts a pictorial diagram illustrating a display of a hotel server response in accordance with the present invention.

Referring now to FIG. 8, a pictorial diagram illustrating a display of a hotel server response is depicted in accordance with the present invention. The response from the hotel servers 505–509 may be automatic and/or tailored to the customer's query. The following is a XML entry for hotel server response depicted in FIG. 8:

```
<Hotels>
    Name of Hotel=Holiday Inn
        <Location>
            City=Falls Church
            State=VA
            Country=USA
            Address=2345 Leesburg Pike
        </Location>
        <Availability>
            <Room type 1>
                Description<2 bed twin
                Offered rate=$55.00
                Discount applied=IBM
            </Room type 1>
            <Room type 2>
                Description=2 bed queen
                Offered rate=$80.00
                Discount applied=IBM
            </Room type 2>
            <Room type 3>
                Description=suite
                Offered rate=$110.00
                Discount applied=IBM
            </Room type 3>
        </Availability>
        <Special accommodations>
            Handicap access
        </Special accommodations>
        <Recreation>
            <Amenity 1>
                Amenity=Health club
            </Amenity 1>
            <Amenity 2>
                Amenity=Pool
            </Amenity 2>
        </Recreation>
        <Information 1>
            Information=Public transportation
            Description=Metro station 2 miles from hotel Complimentary shuttle to station
        </Information 1>
</Hotel>
```

The offered rate will be the best of the applicable discount rates, as determined by the hotel servers in step 705 in FIG. 7.

Referring back to FIG. 4, based upon the responses received from the hotel servers 505–509, the client 502 may generate an email message to the hotels requesting more information (step 407). This message may be answered by a human service representative. A hotel server (e.g., server 507) may generate an automatic response to the new email query by parsing key phrases and finding answers using a knowledge base, such as knowledge base server 510. For example, a hotel server's initial response based on the customer profile may not indicate whether or not the hotel provides handicap access. The client 502 may send an automatic email (or instant message) stating "Please respond stating handicap access." Alternatively, the customer may send the email manually.

Finally, the agent performs a best-fit calculation of the information received from the hotels servers 505–509 and displays the hotel choices in order of their fit to customer criteria (step 408). The best-fit calculation assigns a score to a hotel according to how closely the hotel's server response conforms to the contents and priorities of the customer criteria. The hotels are then ranked according to their relative best-fit score. It is unlikely that any given hotel will conform perfectly to a particular customer profile. The priority values assigned to individual criteria help both the hotel servers and the customer agent to determine the availability of suitable accommodations. For example, if a particular criterion (e.g., handicap access) is priority 1 and the hotel cannot provide such accommodations, the customer agent may simply filter the server response and not display it to the customer. If a hotel cannot accommodate a lower priority criterion (e.g., health club), it would still be displayed to the customer, but might receive a lower ordinal rank in the best-fit list determined by the agent.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for searching for goods and services by means of a computer network, the method comprising:
    compiling a customer profile in a program at a client in the computer network, wherein the customer profile contains data and preferences entered by the customer;
    sending search parameters to a search engine at an aggregate server in the computer network, wherein the search parameters relate to a specified product;
    receiving a list of product suppliers that satisfy the search parameters from the aggregate server,
    automatically selecting and displaying a subset of product suppliers from the list of product suppliers, according to the preferences entered in the customer profile, at the client;
    automatically sending a product query and at least a portion of the customer profile to each product supplier in the selected subset via the computer network,
    automatically receiving product information from each product supplier in the selected subset via the computer network, wherein the product information corresponds to the product query;
    automatically assigning a best-fit score to each product supplier in the selected subset according to how closely the product information received from each product supplier conforms to the preferences entered in the customer profile; and
    automatically ranking and displaying the selected subset of suppliers according to best-fit score at the client.

2. The method according to claim 1, wherein the customer profile is stored on a client machine.

3. The method according to claim 1, wherein the customer profile includes at least one of the following:
    name;
    company name;
    frequent flier number;
    airline used;
    frequent customer number;
    product brand preference;
    special accommodation requirements;
    dining preferences;
    coupons; or
    recreational preferences.

4. The method according to claim 1, wherein the product information received from the product supplier further comprises at least one of the following:
    business discount;
    frequent flier discount;
    frequent customer discount;
    airline discount;
    availability of special accommodations;
    availability of recreational facilities; or
    exclusive services.

5. The method according to claim 1, wherein product information received front a given product supplier further comprises a best price, as determined by the preferences entered in the customer profile.

6. The method according to claim 1, further comprising receiving verification of product availability, according to the preferences entered in the customer profile, from a given product supplier.

7. The method according to claim 1, further comprising:
    requesting additional information from a given product supplier if a first supplier response does not include information specifically requested in the product query.

8. A computer program product in a computer readable medium for use in a data processing system, for searching for goods and services by means of a computer network, the computer program product comprising:
    instructions for compiling a customer profile in a program at a client in the computer network, wherein the customer profile contains data and preferences entered by the customer;
    instructions for entering search parameters into a search engine at an aggregate server, wherein the search parameters relate to a specified product;
    instructions for receiving a list of product suppliers that satisfy the search parameters from the aggregate server;
    instructions for automatically selecting and displaying a subset of product suppliers from the list of product suppliers, according to the preferences entered in the customer profile, at the client;
    instructions for automatically sending a product query and a portion of the customer profile to each product supplier in the selected subset;
    instructions for automatically receiving product information from each product supplier in the selected subset via the computer network, wherein the product information corresponds to the product query;
    instructions for automatically assigning a best-fit score to each product in the selected subset according to how closely the product information received from each product supplier conforms to the preferences entered in the customer profile; and instructions for automatically ranking and displaying the selected subset of suppliers according to best-fit score, at the client.

9. The computer program product according to claim 8, wherein the customer profile is stored on a client machine.

10. The computer program product according to claim 8, wherein the customer profile includes at least one of the following:
- name;
- company name;
- frequent flier number;
- airline used;
- frequent customer number;
- product brand preference;
- special accommodation requirements;
- dining preferences;
- coupons; or
- recreational preferences.

11. The computer program product according to claim 8, wherein the product information received from the product supplier further comprises at least one of the following:
- business discount;
- frequent flier discount;
- frequent customer discount;
- airline discount;
- availability of special accommodations;
- availability of recreational facilities; or
- exclusive services.

12. The computer program product according to claim 8, wherein the product information received from a given product supplier further comprises a best price, as determined by the preferences entered in the customer profile.

13. The computer program product according to claim 8, further comprising instructions for receiving verification of product availability, according to the preferences entered in the customer profile, from a given product supplier.

14. The computer program product according to claim 8, further comprising:

instructions for requesting additional information from a given product supplier if a first supplier response does not include information specifically requested in the product query.

15. A system for searching for goods and services by means of a computer network, the system comprising:

a compiler that creates a customer profile in a program at a client in the computer network, wherein the customer profile contains data and preferences entered by the customer;

a input component that enters search parameters into a search engine at an aggregate server in the computer network, wherein the search parameters relate to a specified product;

a first receiving component that receives a list of product suppliers that satisfy the search parameters from the aggregate server;

a processing component that automatically selects and displays a subset of product suppliers from the list of product suppliers, according to the preferences entered in the customer profile, at the client;

a communication component that automatically sends a product query and a portion of the customer profile to each product supplier in the selected subset via the computer network;

a second receiving component that automatically receives and displays product information from each product supplier in the selected subset, wherein the product information corresponds to the product query;

an assigning component that automatically assigns a best-fit score to each product supplier in the selected subset according to how closely the product information received from each product supplier conforms to the preferences entered in the customer profile; and a ranking component that automatically ranks and displays the selected subset of suppliers according to best-fit score, at the client.

* * * * *